May 18, 1954   V. S. THOMPSON   2,678,674
VEHICLE TIRE
Filed Feb. 27, 1952

INVENTOR.
Vincent Swire Thompson
BY
Alex E. Miedae
Attorney.

Patented May 18, 1954

2,678,674

UNITED STATES PATENT OFFICE 2,678,674

VEHICLE TIRE

Vincent Swire Thompson, Ottawa, Ontario, Canada

Application February 27, 1952, Serial No. 273,649

7 Claims. (Cl. 152—208)

This invention relates to vehicle tires of the pneumatic type.

An object of the invention is to provide a tire having improved anti-sideskid properties and which is substantially effective in preventing lateral slipping or skidding of a vehicle equipped therewith, particularly on slippery surfaces such as are caused by ice and the like.

The invention contemplates the provision of a rubber tire having a circumferential rubber flap in laterally spaced relation to each side of the normal or conventional tread surface of the tire, each flap having fixed to its outer face a plurality of metal plates or cleats, the lower edges of such plates being substantially flush with the edge of the flap.

Figure 1:
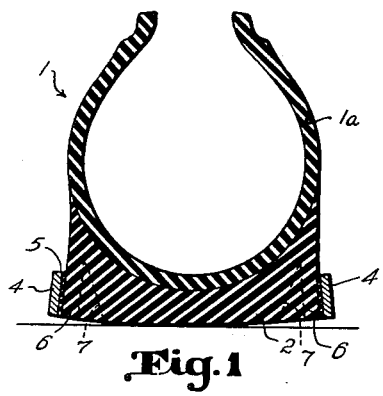
Figure 2:
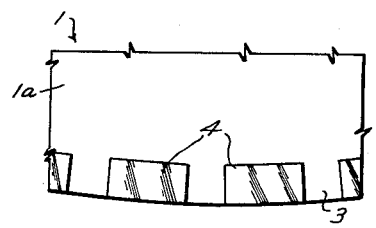
Figure 3:
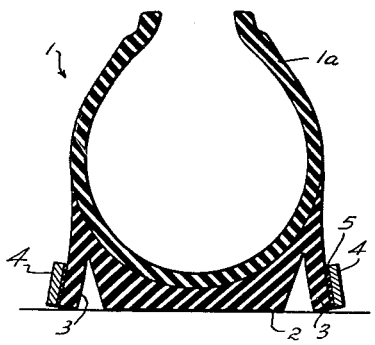
Figure 4:
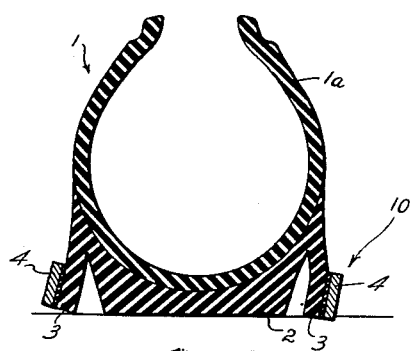
Figure 5:
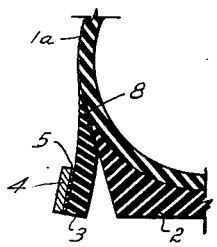

The invention will be described with reference to the accompanying drawing, in which, Figure 1 is a transverse section of a tire in course of construction in accordance with the invention, Figure 2 is a partial side view of the tire, Figure 3 is a transverse section of the completed tire in normal load-bearing condition, Figure 4 is a transverse section of the tire showing anti-sideskid effect thereof, and Figure 5 is a partial transverse section showing a slightly modified form of tire.

In the drawing, 1 is a pneumatic rubber tire having a body portion 1a and a tread portion 2 of conventional form and construction. Fixed to the tire adjacent each side of the tread portion and normally in laterally spaced relation thereto is a circumferentially extending rubber flap 3, which is flared slightly outwardly and the lower or free end of which is normally substantially flush with or slightly above the surface of the tread portion. Preferaby, the flap should have a width not substantially less than one-half inch and not substantially greater than one and one-half inches. For a standard tire of 670 x 15 size, a flap of approximately one inch width is satisfactory. The thickness of the flap may vary but, preferably, it should lie within the range one-eighth to one-half inch, a satisfactory thickness being approximately one-quarter inch.

Fixed to the outer face of each flap are a plurality of metal plates or cleats 4 formed of high grade steel or the like. The plates may be fixed to the flaps in any suitable manner as by cementing thereto, as indicated at 5, with available cements for fixing metal to rubber such as that known under the trade name "Ty-Ply." The plates may be plated with a non-rusting metal, such as brass or the like. Each plate is preferably of rectangular shape and has one edge substantially flush with the edge of the flap. The plates may vary in size but one ⅝" x ⅛" x 1" is satisfactory, the longest side edge of the plate being placed in registry with the side of the flap. The plates are arranged in circumferentially spaced relation on the flap, a spacing therebetween of approximately one-half inch being satisfactory. However, the spacing may vary greatly but should not substantially exceed one inch.

The flaps 3 may be formed on the tire in various ways. Referring to Fig. 1, the tread portion 2 may be initially formed of somewhat greater width than that normally provided to produce laterally extending and slightly outwardly flared corner areas 6 on the side faces of which the plates 4 are mounted in the manner described. Triangular or like grooves, indicated by the dotted lines 7, are then cut circumferentially of the tire to produce the flaps 3.

The invention is particularly applicable to incorporation in the retreading operation in tires. Thus, the new tread portion or "camelback," as it is known in the trade, substantially similar to the tread portion 2 shown in Figure 1, with the widened corner areas 6, is adhesively fixed to the old tire body portion or casing. The plates 4 are adhesively mounted on the new tread portion either before or after mounting on the tire casing. Thereafter the tire is subjected to a vulcanizing treatment to vulcanize simultaneously the cements employed in fixing both the plates to the tread portion and the tread portion to the casing, thus avoiding two separate vulcanizing operations. The circumferential grooves are then cut in the tread portion to produce the flaps 3.

Figure 5 illustrates a modified form wherein the flaps 3 are separately formed and subsequently affixed to the tire as by a suitable cement 8.

It will be observed that the flaps 3 are laterally spaced from the normal tread area of the tire and are of such width and thickness that they are incapable of carrying load. Thus, they bend or buckle slightly into the position shown in Figure 3 as a result of compression of the main mass of the tire tread portion under normal operation, the slight outward flaring of the flaps ensuring that the bending or buckling is in an outward direction. In this position, the inner rubber corner only of each flap is in engagement with the road surface, the plates 4 being normally free from contact with the road surface, thus avoiding objectionable noise.

Should lateral slipping or skidding movement develop in a vehicle equipped with tires such as described, the flap 3 on one or more of tires facing the direction of skid will assume the position indicated at 10 in Figure 4, wherein the corner of a metal plate 4 has begun to bite into the road surface. It will be apparent that as the skid continues the metal corners of the flap 3 will exert a gripping contact with respect to the road surface to effectively restrain the sideskidding.

I claim:

1. A vehicle tire of the pneumatic rubber type having a body portion and a tread portion of conventional form, an annular rubber flap fixed to each side of said tread portion and radially outwardly of the major part of said body portion and having a free edge normally lying in substantially the plane of the surface of said tread portion and in spaced relation thereto, said flap being inherently outwardly flared with respect to said body portion to place said free edge of the flap in laterally outward relation to said body portion, each said flap having a width at least three times its thickness, said flap thereby being non-load bearing in the radial direction of the tire, and a plurality of metal plates fixed to the outer face of each flap, each said plate having an edge substantially coinciding with said free edge of the flap.

2. A vehicle tire as defined in claim 1, each said flap having a width lying in the range one-half to one and one-half inches and a substantially uniform thickness lying in the range one-eighth to one-half inches.

3. A vehicle tire as defined in claim 1, each said flap having a width of approximately one inch and a substantially uniform thickness of approximately one-quarter inch.

4. A vehicle tire as defined in claim 1, said plates being spaced from each other a distance not substantially exceeding one inch.

5. A vehicle tire as defined in claim 1, said flaps being integral with said tread portion.

6. A vehicle tire as defined in claim 1, each said flap comprising a strip having one edge adhesively secured to said tread portion.

7. An anti-sideskid tire having a body portion and a tread portion, a rubber flap fixed to and a tread portion, a rubber flap fixed to tire in laterally spaced relation to each side of said tread portion and radially outwardly of the major part of said body portion, said flap extending circumferentially of the tire and being flared outwardly from said tread portion to place the free edge of said flap in laterally outward relation to said body portion when said flap is in freely suspended position with respect to said tire, said flap being at least one-half inch in width and not substantially more than one-eighth inch in thickness, said flap thereby being non-load bearing in the radial direction of the tire, and a plurality of metal plates fixed to the outer face of each flap, the edge of one side of each plate substantially coinciding with the edge of said flap.

References Cited in the file of this patent

UNITED STATES PATENTS

| Number | Name | Date |
| --- | --- | --- |
| 1,581,590 | Moore | Apr. 20, 1926 |
| 2,017,891 | Briggs | Oct. 22, 1935 |
| 2,235,375 | Kraft | Mar. 18, 1941 |
| 2,333,447 | Shippel | Nov. 2, 1943 |
| 2,354,715 | Tarbox | Aug. 1, 1944 |
| 2,417,466 | Brewer | Mar. 18, 1947 |
| 2,476,146 | Hawkinson | July 12, 1949 |
| 2,497,774 | Hursh | Feb. 14, 1950 |

FOREIGN PATENTS

| Number | Country | Date |
| --- | --- | --- |
| 26,343 | Great Britain | 1905 |